Patented Dec. 27, 1938

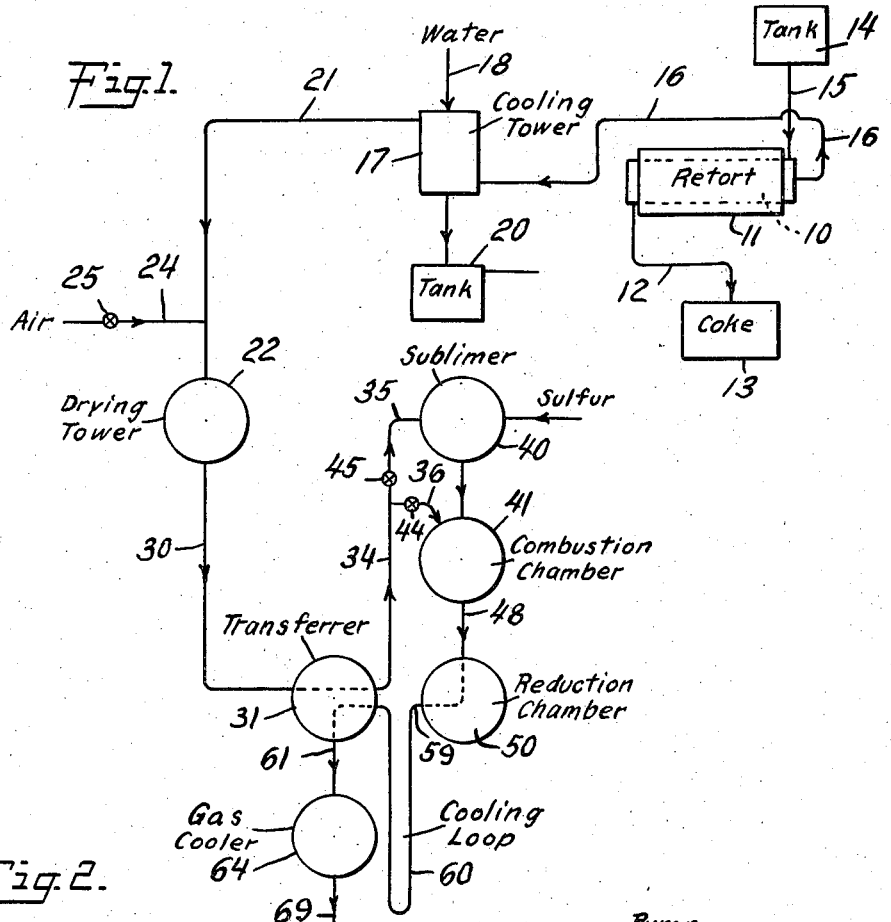
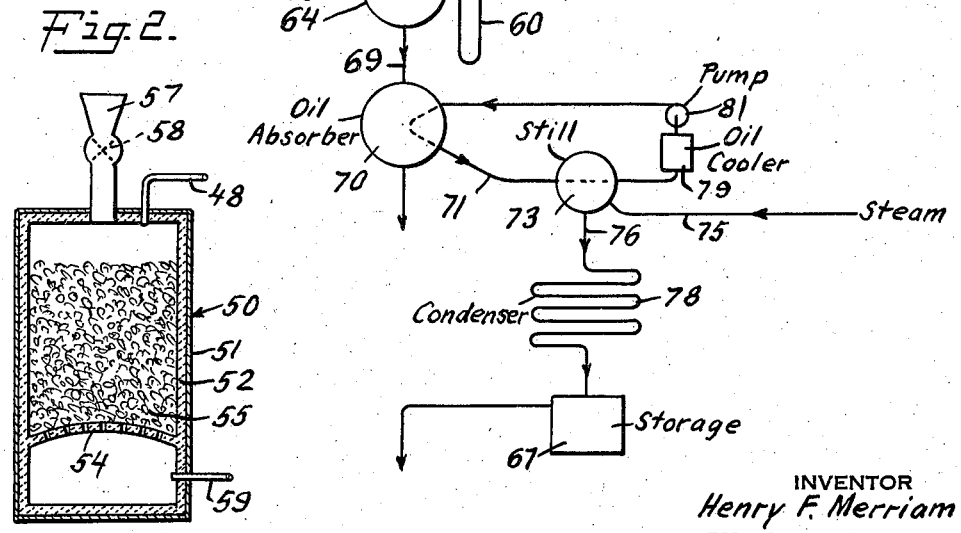

2,141,757

UNITED STATES PATENT OFFICE

2,141,757

MANUFACTURE OF CARBON BISULPHIDE

Henry F. Merriam, West Orange, N. J., assignor to General Chemical Company, New York, N. Y., a corporation of New York Application September 29, 1936, Serial No. 103,126

7 Claims. (Cl. 23—206)

This invention relates to the manufacture of carbon bisulphide. More particularly, the invention is directed to production of carbon bisulphide by reacting sulphur, especially in the form of sulphur dioxide gas, and solid carbonaceous material.

Production of carbon bisulphide from sulphur dioxide and solid carbonaceous material such as wood charcoal has heretofore been suggested. Acid sludges constituting waste products of oil refining processes in which sulphuric acid is used may be decomposed by heating to produce relatively large amounts of sulphur dioxide gas and substantial quantities of solid carbonaceous coke-like residues. Acid sludge coke containing little or no volatile matter is a particularly active type of carbonaceous material and may be used as a source of carbon in the manufacture of carbon bisulphide. In the past, carbon bisulphide has been commonly produced by reacting sulphur vapor and wood charcoal at high temperatures, e. g. around 1550–1650° F. in externally heated pots or retorts. These retorts are pear-shaped and small, being generally not more than about 30 inches in diameter. It has been impractical to make the retorts much larger because the high external temperatures required to force the necessary heat to the center of the reaction mass would be prohibitive. The retorts have been made of cast iron and are relatively short-lived on account of the deteriorating effects of the high temperatures externally applied and the corrosive effects of sulphur and carbon bisulphide produced. Furthermore, large numbers of such retorts are required to obtain any substantial production of product. Consequently, installation and maintenance costs are high, retort replacements constituting a considerable portion of operating costs. On account of the endothermic nature of the reaction of carbon and sulphur, whether the sulphur is supplied as sulphur vapor or as sulphur dioxide, supply of heat to the reaction is a problem always involved.

One of the principal objects of the present invention is to provide for the manufacture of carbon bisulphide from sulphur, principally as sulphur dioxide gas, and from solid carbonaceous material by a method by which sulphur dioxide gases and acid sludge cokes, both derived from waste material such as acid sludges, may be used to advantage as sources of sulphur and carbon. Another object of the invention is to provide a method by which the heat necessary to carry out the endothermic reaction of sulphur and carbon and by which heat losses by radiation may be supplied by burning brimstone, the relatively large amount of heat generated being used to satisfy the heat requirements of the sulphur-carbon reaction and to offset radiation losses, and the sulphur dioxide formed by burning the brimstone being simultaneously utilized in the process as a source of sulphur. A further object of the invention is to overcome the disadvantages mentioned above in connection with apparatus usually employed in the manufacture of carbon bisulphide. The invention provides processes by which waste materials such as acid sludges may be used as sources of sulphur and carbon, by which heat needed to carry out the reaction is generated by burning sulphur to sulphur dioxide which is subsequently reacted with carbon to produce carbon bisulphide, and by which apparatus cheaply built and maintained may be employed.

In carrying out the more desirable embodiments of the invention, in one apparatus unit acid sludge is decomposed by heating to produce sulphur dioxide gas and the above-mentioned solid carbonaceous coke-like residues. The raw sulphur dioxide gas is cooled and there is produced a gas mixture having a sulphur dioxide concentration of upwards of say 85%. In another apparatus unit, elemental sulphur is burned preferably with no more than enough air to supply oxygen sufficient to oxidize the sulphur to sulphur dioxide. Combustion of sulphur under these conditions generates a large amount of excess heat. In accordance with the invention, the amount of sulphur burned is such as to generate heat enough so that when the hot combustion products of the sulphur burning operation are mixed with concentrated sulphur dioxide gas from the acid sludge decomposing unit, the resulting gas mixture contains sufficient amount of heat so that when such mixture is introduced into a reduction zone to react carbon and sulphur dioxide to produce carbon bisulphide enough heat is brought into the reduction zone to maintain the endothermic reaction and offset radiation losses. The gaseous products of the reduction reaction are cooled, and the carbon bisulphide produced is recovered.

The nature of the invention, operating details, objects and advantages thereof may be more fully understood from the following description taken in connection with the accompanying drawing, in which Fig. 1 is a diagrammatic illustration of a plant layout; and Fig. 2 is a vertical section of an individual reaction chamber.

As indicated, concentrated sulphur dioxide gas and the carbonaceous material preferably used in the process of the invention as sources of sulphur and carbon are preferably sulphur dioxide gases and acid sludge coke obtained by decomposition of sulphuric acid sludges constituting waste products of oil refining processes. Referring particularly to the sulphur dioxide and acid sludge coke production unit of the plant layout of Fig. 1 of the drawing, 10 indicates a sludge decomposing retort. The particular construction of the retort is no part of the invention although the sludge is preferably decomposed in the absence of air or other diluting gas by external heating. Retort 10 may consist for example of a fixed drum or chamber extending through furnace setting 11 and may be equipped with rabbles or a screw conveyor by which the coke formed during decomposition of the sludge is continuously discharged from retort 10 through an outlet 12 and collected in a coke storage chamber 13. A rotary kiln may be employed if desired. Acid sludge may be fed from tank 14 through pipe 15 containing a suitable control valve.

One end of gas conduit 16 opens into the interior of the sludge decomposing chamber and affords means for conducting the gases and vapors generated by decomposition of the sludge into the bottom of the cooling tower 17. The latter may be a vertical cylindrical vessel provided at the top with a spray arranged to create in the tower a downwardly flowing spray of water or other cooling liquid introduced through pipe 18. Water and condensate run out of the bottom of the tower through an outlet pipe into a receiving tank 20. After rising through the tower, in countercurrent flow to the cooling liquid, the cooled sulphur dioxide gases are discharged from the top of the tower into gas line 21 connected to a drying tower 22. Air employed to support combustion of sulphur in a subsequent stage of the process is introduced ahead of the drying tower through an inlet 24 having a control valve 25. The dried mixture of sulphur dioxide gas and air flows through conduit 30, through heat transferrer 31 and thence through conduit 34 and pipe connections 35 and 36 into sublimer 40 or combustion chamber 41, the proportions of the gas mixture fed into the sublimer and the combustion chamber being regulated by adjustment of valves 44 and 45. Sublimer 40 and the associated combustion chamber 41 may be of any approved construction. The hot combustion gases from chamber 41 flow through line 48 into reduction chamber 50 shown diagrammatically in Fig. 1. As illustrated in Fig. 2, reduction chamber 50 comprises a vertically elongated steel shell 51 provided with a lining 52 of suitable refractory material such as firebrick. In the lower end of the reaction chamber is a perforated arch 54 affording support for a bed 55 of charcoal or coke of substantial depth. Solid carbonaceous material as from coke storage chamber 13 is fed into the top of reduction chamber 50 from hopper 57 by an air-lock 58. Carbon bisulphide, gases and other vapors formed during the reaction are discharged from the reaction chamber through pipe 59 and flow through cooling loop 60 into heat transferrer 31. The reaction gases pass thence through pipe 61 into a cooler 64. The vapor outlet pipe 69 of cooler 64 opens into the bottom of an absorbing tower 70 over which an absorbent oil is circulated. The effluent oil of tower 70 runs through line 71 into a still 73 provided with a steam connection 75. Vapors from still 73 flow through pipe 76 into condenser 78. Absorbing oil discharged from still 73 runs into a cooler 79 and is recirculated over tower 70 as by pump 81.

In carrying out the process of the invention, relatively concentrated sulphur dioxide, produced in any way, and wood charcoal may be used as the source of sulphur and carbon, although it is preferred to use concentrated sulphur dioxide gases and acid sludge coke which may be produced in the sludge decomposing unit shown in Fig. 1 as follows:

Sulphuric acid sludges, resulting from refining of oils, vary in composition. One representative sludge was found to have a titratable acidity of about 50.8% expressed as $H_2SO_4$, and yielded on decomposition by destructive distillation about 28% residual coke, and a retort gas which, after cooling to about normal temperatures, produced about 6% condensable oils, about 35% water, based on the weight of the sludge, the balance of the retort gas comprising sulphur dioxide, carbon dioxide, carbon monoxide, nitrogen, and uncondensable hydrocarbons and water vapor. Although the invention is not dependent upon any particular method for the destructive distillation of sludge material, derived from sulphuric acid refining of oils, to produce sulphur dioxide gas and sludge coke, decomposition of the sludge is preferably effected by externally heating a body of sludge, in a substantially air-tight, elongated kiln or retort, mounted in a furnace setting and arranged to provide for feed of sludge into and withdrawal of sulphur dioxide gases from one end, discharge of residual coke from the other end, and maintenance of the higher temperatures at the coke discharge end and lower temperatures at the sludge inlet end. The burners in the furnace combustion chamber 11 are controlled so as to maintain sludge material temperatures in the retort not less than about 300° F. at the cold end and not more than about 700° F. at the hot end. It is preferred to maintain temperatures of about 325° F. at sludge inlet end and about 450° F. at coke discharge end. On heating, the free and combined sulphuric acid contained in the sludge is reduced by hydrocarbons and/or by the carbonaceous matter present in the sludge, and the gas mixture evolved contains sulphur dioxide and water vapor, as the major constituents, together with smaller quantities of hydrocarbon vapors, carbon dioxide, carbon monoxide and nitrogen.

As a rule, decomposition of the sludge is effected at temperatures such as above noted, and under such conditions that decomposition proceeds only to approximately a point at which most of the free and combined sulphuric acid initially contained in the sludge is reduced. Under these conditions, the solid carbonaceous residues formed usually contain appreciable quantities of volatile hydrocarbons. In the case of some sludges the volatile matter content of this residue may run in excess of 38–40%. Sludge coke produced by the above method and discharged from retort 10 into coke storage bin 13 may analyze substantially as follows:

| | Per cent |
|---|---|
| Total acidity $H_2SO_4$ | 2.1 |
| Ash | 1.2 |
| Total volatile matter, including $H_2SO_4$ | 32.1 |
| Fixed carbon | 66.7 |

If desired, decomposition of the sludge may be carried out so that most of the volatile matter is driven out of the coke although it is preferred to proceed as described to avoid formation of a relatively large amount of non-condensable hydrocarbons which tend to increase hydrogen sulphide formation in the subsequent carbon bisulphide production stage.

The gases formed in retort 10 by decomposition of the sludge and discharged into pipe connection 16 contain generally not substantially in excess of 20% by volume of sulphur dioxide, around 75-80% water vapor, and smaller quantities of hydrocarbon vapors and carbon dioxide. The retort gas flows through line 16 into cooling tower 17 and is contacted therein with a downwardly flowing stream of water introduced through pipe 18. The gas stream rising through the tower is cooled, and the bulk of the water and condensable hydrocarbon vapors of the retort gas stream are condensed and run out of the tower with the cooling liquid into tank 20. The quantity of water run through the tower is regulated so as to cool the sulphur dioxide gas to about 100° F. at which temperature the gas stream enters the gas line 21 and is conducted into drying tower 22.

The gas in conduit 21 is a concentrated gas and may contain 85 to practically 100% $SO_2$. Where the gas contains less than 100% $SO_2$ the diluents comprise small quantities of $CO_2$, CO, $N_2$ and hydrocarbons. Although it is preferred to use strong sulphur dioxide gases of the type mentioned, weaker gases may be employed if desired.

By adjustment of valve 25, the quantity of air required to support combustion of sulphur in sublimer 40 is introduced into pipe 21, and the combined mixture of sulphur dioxide gas and air is introduced into the bottom of drying tower 22 which may be operated the same as drying towers well known in the sulphuric acid art. Substantially complete drying of the gas is desirable since hydrogen combines with sulphur thus increasing sulphur losses as $H_2S$ in the subsequent reduction process. The effluent gas of the drying tower, at temperatures of about 100° F. runs through line 30 into transferrer 31 in which the gas is heated by heat transfer from outgoing hot reaction products to temperatures of about 700° F.

Sublimer 40 is preferably of the type in which a relatively small amount of sulphur is burned to sulphur dioxide, and the heat generated is utilized to vaporize the balance of the sulphur in the sublimer. The sulphur dioxide and the sulphur vapor produced in the sublimer are then fed into a combustion chamber in which the sulphur vapor is burned to sulphur dioxide. In the preferred form of the process, the amount of air introduced into the system by adjustment of valve 25 is not more and permissibly less than enough to burn all of the brimstone employed in the process to sulphur dioxide. It is not desirable to introduce into the system a quantity of air such that there might be some free oxygen in the exit gas of the combustion chamber, since the presence of free oxygen in the gas increases the COS, $CO_2$ and CO content of the reduction chamber exit gas. Since only a part of the sulphur introduced into sublimer 40 is burned therein to sulphur dioxide, only enough air for this purpose is passed into the sublimer. Accordingly, valve 45 is adjusted so as to permit introduction into the sublimer of a sufficient amount of the air-sulphur dioxide gas mixture in line 34 to supply oxygen enough to burn the desired limited quantity of sulphur in sublimer 40. The amount of oxygen introduced into the sublimer through pipe 35 in the form of air is of course dependent upon the quantity of sulphur used in the process. When working with a gas of the nature described, the air-sulphur dioxide gas mixture in pipe 34 may be split by adjustment of valves 44 and 45 so that approximately one volume of the gas mixture of line 34 enters sublimer 40 through pipe 35 to about eight to ten volumes of gas entering combustion chamber through pipe 36.

The effluent gas mixture of sublimer 40 containing for example about 23% sulphur dioxide and about 18% sulphur (calculated as $S_8$) vapor is fed into combustion chamber 41 in which the sulphur vapor is burned to sulphur dioxide. Since as indicated above there is no more air introduced into the system than is necessary to burn the sulphur dioxide the brimstone fed into the sublimer, burning of such brimstone produces a gas containing approximately 21% sulphur dioxide, 79% nitrogen and no free oxygen. Burning of the sulphur under these conditions generates sufficient heat to raise the temperature of such 21% $SO_2$—79% nitrogen gas as high as about 3000–3300° F., which temperature is much in excess of the 1500–1600° F. reaction temperature required in reduction chamber 50 to cause reaction of sulphur dioxide and carbon to produce carbon bisulfide. In accordance with the invention, the excess heat developed by burning the sulphur is utilized to heat up to reaction temperature the cold strong sulphur dioxide gas introduced into the system through pipe 21. The quantity of brimstone burned in the process is dependent upon specific operating conditions and radiation loss. In accordance with the invention, the quantity of brimstone introduced into the system and burned to sulphur dioxide is such as to produce heat enough so that, when the hot sulphur dioxide gas produced by burning of sulphur preferably with not more air than to oxidize the sulphur to sulphur dioxide is mixed with the cold incoming sulphur dioxide gas of whatever concentration, the temperature of the resulting gas mixture is sufficient to carry into reduction chamber 50 heat enough to maintain the endothermic reaction and to offset radiation losses in the system.

For example, when working under the preferred conditions, i. e. introducing into the system no more air than necessary to burn to sulphur dioxide the brimstone fed into the sublimer, about 1.88 lbs. of brimstone burned with about 100 cubic feet of air produces a gas comprising 21 cubic feet $SO_2$ and 79 cubic feet of $N_2$ and heated to temperature of about 3000° F. About 1 lb. of sulphur (as $SO_2$ from the sludge gas) is equivalent to about 2 lbs. of sulphur dioxide giving about 11.2 cubic feet of approximately 100% $SO_2$ sludge gas at a temperature of about 100° F. The latter gas is mixed with the 21 cubic feet of $SO_2$ and the 79 cubic feet of $N_2$ (produced by burning brimstone) giving a gas entering reduction chamber 50 containing about 29% $SO_2$ and about 71% $N_2$, the temperature of such gas mixture being about 3000° F., (taking into consideration the approximate 700° F. of preheat contained in the incoming sludge $SO_2$ gas and air obtained by passage through the heat exchanger 31). On the basis of the foregoing, the composition of gas leaving reduction chamber 50 may be approximately as follows:

|  | Products formed from sulphur introduced into system as brimstone, in cubic feet | Products formed from sulphur introduced into system as sludge $SO_2$ gas, in cubic feet | Total | Per cent by volume |
| --- | --- | --- | --- | --- |
| $CO+CO_2$ | 35.0 | 18.7 | 53.7 | 34.9 |
| $COS+H_2S$ | 7.0 | 3.7 | 10.7 | 6.9 |
| $N_2$ | 79.0 |  | 79.0 | 51.3 |
| $CS_2$ | 7.0 | 3.7 | 10.7 | 6.9 |
|  |  |  | 154.1 | 100.0 |

It is noted that no operating difficulties are encountered by regulating the amount of air introduced into the system to only that necessary to oxidize the brimstone to sulphur dioxide. In fact under some circumstances, in order to insure the absence of free oxygen in the exit gas of the combustion chamber, it might be desirable to operate with a deficiency of air since any unburned sulphur vapor passes along through the combustion chamber 41 and pipe 48 into reduction chamber 50, and the sulphur as such reacts with the carbon to produce carbon bisulphide.

When carrying out the process of the invention, in order to obtain a high yield of carbon bisulphide under most economical conditions, it is preferable to use in the reaction chamber 50 sludge material coke from which the volatile matter has been expelled by heating to temperatures of 1400–1500° F. for a sufficient period of time to drive substantially all of the volatile matter out of the coke or in any case to reduce the volatile matter of the coke to not more than about 3%. When following this procedure the coke from bin 13 is so treated and then utilized in reduction chamber 50.

At the high temperatures prevailing in the reaction chamber 50 by reason of the heat brought in with the hot sulphur dioxide gas, carbon and sulphur dioxide combine to form carbon bisulphide vapor which leaves the reaction chamber through pipe 59. Gases in pipe 59, at temperatures of say 1550–1650° F., and which may be of the composition above noted, flow through loop 60 and are cooled down to about 1100° F. at which temperatures the reaction gas stream passes through transferrer 31, the heat of the reaction gases being transmitted to the cold sulphur dioxide gas. If desired, transferrer 31 may be made of an alloy of high heat resisting properties and the hot exit gas of the reaction chamber 50 may be introduced directly into transferrer 31, thus imparting more heat to cool incoming gases and reducing the amount of sulphur burned in the system. The reaction gases cooled to about 500° F. pass through line 61 into cooler or condenser 64 in which the vapors are cooled to about normal temperatures. Residual gases of condenser 64 contain COS and appreciable amounts of $CS_2$ vapor. These gases are then passed into the bottom of tower 70 over which an absorbent oil such as straw oil is circulated. The oil absorbs the carbon bisulphide which has escaped from the condenser 64, and the effluent oil of tower 70 runs through line 71 into the still 73. Steam from line 75 is introduced into the latter and carbon bisulphide is vaporized and passes through line 76 into condenser 78. The temperature of the oil discharged from still 73 is reduced to about 100° F. in cooler 79 and is again passed over absorbing tower 70 by pump 81. The exit gases of tower 70 may be vented to the atmosphere or treated as desired to recover sulphur values.

The principles of the invention, involving heat supply to a sulphur-carbon reaction zone by burning sulphur in the main incoming gas stream, are applicable to modifications other than that just described. For example, brimstone may be burned with less oxygen or air than is necessary to complete combustion of all of the brimstone, thus producing a gas mixture containing $SO_2$, sulphur vapor and no free oxygen. When such gas mixture is passed into the reaction chamber the sulphur vapor and the sulphur of the $SO_2$ react with the carbonaceous material to form $CS_2$. In this modification it will be understood the amount of brimstone burned to $SO_2$ is regulated so that the resulting gas mixture passing into the reaction chamber contains a sufficient quantity of heat to maintain the endothermic reaction.

If desired, brimstone may be burned under conditions such that substantially all of the sulphur is oxidized to a sulphur dioxide gas containing preferably no free oxygen, and heat over and above that needed to maintain the carbon bisulphide production reaction removed by any suitable means prior to introduction of the gas into the reaction zone. According to another modified procedure, sulphur may be melted and vaporized by external heat, for example by burning coke obtained from the decomposition of acid sludge. A preferably dry mixture of sludge sulphur dioxide and air in quantity sufficient to burn the sulphur vapor to sulphur dioxide and nitrogen may be introduced into combustion chamber 41 where the vaporized sulphur is burned. By proceeding in this manner, the additional heat supplied by the external source makes it possible to use about twice as much sludge sulphur dioxide as in that form of the invention discussed in connection with the drawing.

The invention thus provides a process in accordance with which sulphur dioxide and coke both obtained from waste material such as acid sludges may be utilized as sources of sulphur and carbon in the production of carbon bisulphide. The extraneous heat needed to maintain the sulphur-carbon reaction in the reduction chamber is obtained by burning sulphur to produce sulphur dioxide which itself is employed as a source of sulphur in the reduction process. The amount of heat needed to maintain the reaction is introduced into the reaction zone along with the reactant gases and consequently a large reaction chamber cheaply constructed of a steel shell and refractory lining may be employed instead of the expensive prior art apparatus previously mentioned.

I claim:

1. The method for making carbon bisulphide from sulphur dioxide containing gas initially at temperature less than that necessary to effect combination of sulphur of said sulphur dioxide and carbon to produce carbon bisulphide which comprises burning, with oxygen, sulphur in at least such amount that when burned with said oxygen and the combustion products formed are mixed with said sulphur dioxide containing gas the temperature of the resulting gas mixture is raised sufficiently high to effect combination of sulphur and carbon to produce carbon bisulphide, introducing said sulphur dioxide containing gas and said sulphur combustion products into a reaction zone containing a body of carbonaceous material, effecting combination in said zone of sulphur of said sulphur dioxide and sulphur of said sulphur combustion products with carbon of the carbonaceous material to produce carbon bisulphide, and recovering carbon bisulphide.

2. The method for making carbon bisulphide from sulphur dioxide containing gas initially at temperature less than that necessary to effect combination of sulphur of said sulphur dioxide and carbon to produce carbon bisulphide which comprises burning, with oxygen, sulphur in at least such amount that when burned with said oxygen and the combustion products formed are mixed with said sulphur dioxide containing gas the temperature of the resulting gas mixture is raised sufficiently high to effect combination of sulphur and carbon to produce carbon bisulphide, said burning of sulphur being effected with not substantially more oxygen than necessary to convert the sulphur thus burned to sulphur dioxide, introducing said sulphur dioxide containing gas and said sulphur combustion products into a reaction zone containing a body of carbonaceous material, effecting combination in said zone of sulphur of said sulphur dioxide and sulphur of said sulphur combustion products with carbon of the carbonaceous material to produce carbon bisulphide, and recovering carbon bisulphide.

3. The method for making carbon bisulphide from sulphur dioxide containing gas initially at temperature less than that necessary to effect combination of sulphur of said sulphur dioxide and carbon to produce carbon bisulphide which comprises introducing into said gas sulphur and sulphur combustion supporting oxygen, said sulphur being at least such amount that when burned the temperature of the resulting gas mixture is raised sufficiently high to effect combination of sulphur and carbon to produce carbon bisulphide, burning said sulphur with said oxygen, introducing the resulting gas mixture comprising said sulphur dioxide containing gas and the sulphur combustion products formed into a reaction zone containing a body of carbonaceous material, effecting combination in said zone of sulphur of said sulphur dioxide and sulphur of said sulphur combustion products with carbon of the carbonaceous material to produce carbon bisulphide, and recovering carbon bisulphide.

4. The method for making carbon bisulphide from sulphur dioxide containing gas initially at temperature less than that necessary to effect combination of sulphur of said sulphur dioxide and carbon to produce carbon bisulphide which comprises introducing into said gas sulphur and sulphur combustion supporting oxygen, said sulphur being in at least such amount that when burned the temperature of the resulting gas mixture is raised sufficiently high to effect combination of sulphur and carbon to produce carbon bisulphide, said oxygen being in amount not substantially more than necessary to convert the sulphur thus burned to sulphur dioxide, burning said sulphur with said oxygen, introducing the resulting gas mixture comprising said sulphur dioxide containing gas and the sulphur combustion products formed into a reaction zone containing a body of carbonaceous material, effecting combination in said zone of sulphur of said sulphur dioxide and sulphur of said sulphur combustion products with carbon of the carbonaceous material to produce carbon bisulphide, and recovering carbon bisulphide.

5. The method for making carbon bisulphide which comprises decomposing sludge material, derived from sulphuric acid treatment of petroleum oils, by heating to form solid carbonaceous residue and a hot sulphur dioxide gas mixture containing condensing vapors, cooling the hot gas mixture to condense the bulk of the condensible vapors and forming relatively cool concentrated sulphur dioxide gas, introducing said carbonaceous material into a reaction zone, and burning, with oxygen, sulphur in at least such amount that when burned with said oxygen and the combustion products formed are mixed with said sulphur dioxide gas the temperature of the resulting gas mixture is raised sufficiently high to effect combination of sulphur and carbon to produce carbon bisulphide, introducing said sulphur dioxide gas and said sulphur combustion products into said reaction zone, effecting combination in said zone of sulphur of said sulphur dioxide and sulphur of said sulphur combustion products with carbon of the carbonaceous material containing not more than about 3% volatile matter to produce carbon bisulphide, and recovering carbon bisulphide.

6. The method for making carbon bisulphide which comprises decomposing sludge material, derived from sulphuric acid treatment of petroleum oils, by heating to form solid carbonaceous residue and a hot sulphur dioxide gas mixture containing condensing vapors, cooling the hot gas mixture to condense the bulk of the condensible vapor and forming relatively cool concentrated sulphur dioxide gas, introducing said carbonaceous material into a reaction zone, and introducing into said sulphur dioxide gas sulphur and sulphur combustion supporting oxygen, said sulphur being in at least such amount that when burned the temperature of the resulting gas mixture is raised sufficiently high to effect combination of sulphur and carbon to produce carbon bisulphide, burning said sulphur with said oxygen, introducing the resulting gas mixture comprising said sulphur dioxide gas and the sulphur combustion products formed into said reaction zone, effecting combination in said zone of sulphur of said sulphur dioxide and sulphur of said sulphur combustion products with carbon of the carbonaceous material containing not more than about 3% volatile matter to produce carbon bisulphide, and recovering carbon bisulphide.

7. The method for making carbon bisulphide which comprises decomposing sludge material, derived from sulphuric acid treatment of petroleum oils, by heating to form solid carbonaceous residue and a hot sulphur dioxide gas mixture containing condensing vapors, cooling the hot gas mixture to condense the bulk of the condensible vapors and forming relatively cool concentrated sulphur dioxide gas, introducing said carbonaceous material into a reaction zone and introducing into said sulphur dioxide gas sulphur and sulphur combustion supporting oxygen, said sulphur being in at least such amount that when burned the temperature of the resulting gas mixture is raised sufficiently high to effect combination of sulphur and carbon to produce carbon bisulphide, said oxygen being in amount not substantially more than that necessary to convert the sulphur thus burned to sulphur dioxide, burning said sulphur with said oxygen, introducing the resulting gas mixture comprising said sulphur dioxide gas and the sulphur combustion products formed into said reaction zone, effecting combination in said zone of sulphur of said sulphur dioxide and sulphur of said sulphur combustion products with carbon of the carbonaceous material containing not more than about 3% volatile matter to produce carbon bisulphide, and recovering carbon bisulphide.

HENRY F. MERRIAM.